United States Patent Office 3,179,626
Patented Apr. 20, 1965

3,179,626
PREPARATION OF POLYMERS OF POLYISOCY-
ANATES AND POLYURETHANE POLYMERS
USING DIAZABICYCLO-OCTANE AND ALDE-
HYDES AS CO-CATALYSTS
Burton D. Beitchman, Drexel Hill, Pa., assignor to Air
Products Chemicals, Inc., a corporation of Delaware
No Drawing. Filed Jan. 17, 1961, Ser. No. 83,135
3 Claims. (Cl. 260—77.5)

This invention is directed to new catalysts and catalyst combinations effective in forming polyisocyanates and polyurethanes.

The catalytic activity of certain tertiary amines in effecting the formation of polyurethane elastomers or foams by interaction of diisocyanates and polyols is well recognized in the polyurethane art. A particularly effective and unique tertiary amine in this category is 1,4-diazabicyclo-(2,2,2)-octane (hereinafter called diazabicyclo-octane) as disclosed in U.S. 2,939,851. It has also been recognized that certain basic compounds, including tertiary amines, such as pyridine, triethylamine and N-methyl morpholine, exert a mild catalytic effect in the polymerization of organic isocyanates. Since isocyanate polymerization is ordinarily a very slow reaction relative to the rapid formation of urethanes, isocyanate polymerization and the polymers formed have played little part in polyurethane formation. However, under certain conditions and in the presence of certain catalyst combinations, isocyanate polymerization is sharply accelerated to make isocyanate polymers quite practical, per se, and of significant importance in the polyurethane system.

Accordingly, an object of the present invention is the formulation of a catalyst capable of promoting a rapid polymerization of organic isocyanates to polyisocyanates.

Another object of the present invention is the formulation of a catalyst to promote a rapid interaction of diisocyanates and polyols to produce stable self-curing flexible or rigid, foamed or unfoamed polyurethane resins.

Another object of the present invention is the formulation of a catalyst particularly effective in the condensation of diisocyanates and hydroxy compounds to form polyisocyanate modified polyurethanes and polyurethane modified polyisocyanate resins. These and other objectives are accomplished as hereinafter described:

In accordance with the present invention, polymerization of organic isocyanates and the formation of urethanes is catalyzed by tertiary amines in combination with $C_1$ to $C_{10}$ aldehydes. More particularly, we have found that 1,4-diazabicyclo-(2,2,2)-octane, as representative of tertiary amine catalysts, in combination with an equi-molar to major amount of a $C_1$ to $C_{10}$ aldehyde, such as benzaldehyde, has an unusual and unexpected catalytic effect on organic isocyanates, causing them to polymerize rapidly to polyisocyanates with the release of heat, and on diisocyanate-hydroxy mixtures, causing them to polymerize and/or condense rapidly to polyurethanes. The simultaneous catalysis of the two processes in the presence of diisocyanates and polyols permits the rapid formation of polyisocyanates, polyurethanes, or copolymers of polyisocyanates and polyurethanes in various ratios to produce new and unusual compositions varying from resinous hard solids to flexible elastomers.

It has been recognized heretofore that aldehydes are active in effecting cross-linking of "curing" of polyurethanes. This has generally been effected by treating a preformed polyurethane with an active aldehyde, such as formaldehyde. Thus, Dombrow—"Polyurethane" (Reinhold, 1957) at page 116 describing "Vulcaprene A" states that: "In curing, formaldehyde may be used to cross-link the amide linkages." Similarly, in U.S. 2,921,-860 finished polyurethane foam is treated with formaldehyde, ketene, etc. to improve the color stability of polyurethanes.

In contrast to this, in the process of this invention the catalyst combination comprises an active tertiary amine, such as 1,4-diazabicyclo-(2,2,2)-octane used in conjunction with an aldehyde, which may also be an aldehyde polymer. This catalyst combination effects accelerated polymerization of isocyanates and urethanes together with a rapid and spontaneous curing of the polymer, all with the liberation of heat. The entire reaction is thus promoted by the co-catalytic action of the tertiary amine and aldehyde and by acceleration of the reactivity in the system due to the increase in temperature from exothermic polymerization and condensation.

The nature of the accelerating reaction is not defined, nor the specific contribution that the aldehydes make to the reaction. However, in studying the various components of the reaction it has been found that isocyanates are readily polymerized by a combination of diazabicyclooctane and a $C_1$ to $C_{10}$ aldehyde, whereas isocyanates and diazabicyclooctane react very slowly to form isocyanate polymers and isocyanates are essentially unreactive with aldehydes. Apparently, the catalytic polymerization of the organic isocyanate and the heat evolved thereby is the key to the accelerated formation of either polyisocyanates or polyurethanes. This is shown in a number of examples wherein isocyanates were polymerized in the presence of selected aldehydes and diazabicyclooctane:

EXAMPLE I

*Isocyanate polymerization*

| Diazabicyclo-octane, g. | Aldehyde, g. | Isocyanate, g. | Minutes to max. temp. | Product |
|---|---|---|---|---|
| 0.5 | Butyraldehyde, 32.7 | 0 | | None. |
| 0.25 | Paraldehyde, 52.2 | 0 | | None. |
| 0.5 | Butyraldehyde, 32.7 | TDI,* 49 | 3 | |
| 0.25 | Butyraldehyde, 1.6 | TDI,* 61 | Slow temp. rise | (Solid '18 hr.). |
| 0.25 | o-Anisaldehyde, 56.3 | TDI,* 61 | 9.25 | |
| 0.25 | Paraldehyde, 50 | TDI,* 61 | 7.33 | Trimer (isocyanurate). |
| 0.25 | Benzaldehyde, 52 | TDI,* 61 | Slow | Orange syrup (6.5 hr.). |
| 0 | Benzaldehyde, 52 | TDI,* 61 | | None in 3 hr. |
| 0.25 | Trioxymethylene, 1.0 | Phenyl, 27 | 17 | Trimer, 76% yield. |
| 0.25 | Furfural, 58 | TDI,* 61 | Slow temp. rise | Visc. syrup (1 hr.). |
| 0.25 | Heptaldehyde, 1.7 | TDI,* 61 | Slow temp. rise | Thick syrup (1½ hr.). |

*TDI=Tolylene diisocyanate; 80/20 of 2,4/2,6 isomer.

In these runs the described amounts of reagents were mixed in a reaction vessel immersed in an insulated bath and the time-temperature relationship observed. With roughly 1 wt. percent of diazabicyclooctane and at least an equi-molar amount of a $C_1$ to $C_{10}$ aldehyde co-catalyst present per 100 parts of TDI, the temperature rise is about 140° C. (from about 22° C. to 162° C.) with the highest rate of temperature rise at 4.5 minutes and the maximum temperature reached in about 6 minutes.

To further differentiate the catalytic action of various aldehydes, tolylene diisocyanate polymerization to gel form was studied with diazabicyclooctane and various aldehydes at roughly equivalent molar concentrations:

EXAMPLE II

*TDI polymerization with diazabicyclooctane (0.25 g.=.0023 mol) and aldehydes*

[TDI=61 g.=0.35 mole]

| Aldehyde or polymer aldehyde, g. (moles) | Max. temp., °C. | Minutes to max. temp. | Product description |
|---|---|---|---|
| Acetaldehyde, 2.44 (.055) | 72.8 | 16 | Hard yellow solid. |
| Butyraldehyde, 4.55 (.063) | 110 | 45 | Pale yellow solid. |
| Trioxymethylene, 1.7 (0.056) | 128 | 67 | Yellow solid. |
| Heptaldehyde, 6.33 (.056) | 53 | 93 | Do. |
| Benzaldehyde, 5.88 (0.055) | 82 | 69 | Hard yellow solid. |
| Isodecaldehyde, 8.74 (.056) | 87 | 128 | Yellow solid. |
| O-Anisaldehyde, 7.55 (0.063) | 70 | 242 | Pale yellow solid. |
| Paraldehyde, 2.49 (.057) | 28 | | Copious precipitate over-night. |
| 1-naphthaldehyde, 8.74 (.056) | (*) | (*) | Yellow solution by standing over-night. |

*None in 1st 76 minutes.

Isocyanate ploymerization to a gel has been measured at 75° C. and room temperature with (a) Diazabicyclooctane and a number of active aldehydes and (b) Triethylamine, as a further example of tertiary amine catalysts, and butyraldehyde as a representative aldehyde:

*TDI polymerization to gel with aldehyde-tertiary amine co-catalysts*

[TDI=61 g.=0.35 mole]

| t. Amine, moles | Aldehyde, moles | Product gel time at— | |
|---|---|---|---|
| | | 75° C. | Room temp. |
| Diazabicyclooctane, .0005 | 0 | 190 min | 60 hr. |
| Diazabicyclooctane, 0 | Paraldehyde, 0.005 | 260 min | 66 hr. |
| Diazabicyclooctane, .0005 | do | 20 min | (ungelled). 60 min. |
| Do | Butyraldehyde, 0.005 | 12 min | 27 min. |
| Do | Trioxymethylene, 0.005 | 2 min | 7 min. |
| Do | Butyraldehyde, 0.005 | 6 min | 12 min. |
| Do | Benzaldehyde, 0.005 | 13 min | 22 min. |
| Do | Cinnamaldehyde, 0.005 | 17 min | 27 min. |
| Triethylamine, 0.005 | Butyraldehyde, 0.005 | 210 min | 22 hr. |

On the basis of these experimental evaluations, the activities of the $C_1$ to $C_{10}$ aldehydes generally decreased with increasing molecular weight (with the aldehyde polymers acting as polymers rather than momeric aldehydes):

| | G./mole |
|---|---|
| Acetaldehyde | 42 |
| Butyraldehyde | 72 |
| Trioxymethylene (calculated as formaldehyde trimer) | 90 |
| Benzaldehyde | 106 |
| Heptaldehyde | 114 |
| Isodecaldehyde | 156 |
| Cinnamaldehyde | 132 |
| o-Anisaldehyde | 136 |
| Paraldehyde (calculated as acetaldehyde trimer) | 132 |

Thus active aldehydes in the $C_1$ to $C_{10}$ range having molecular weights ranging from 30 to about 200 are effective co-catalysts.

The process of isocyanate resin formation can be carried further with additional time at room temperature or with supplementary heating to produce polyisocyanates and aldehyde modified polyisocyanates as hard brittle resins.

With 500 parts of tolylene diisocyanate, 4.5 parts of diazabicyclooctane and 9.0 parts of paraform, mixing these ingredients at room temperature produces a viscous syrup. This intermediate product can be used to impregnate fibers or fabrics, such as glass fabrics, for the production of heat-cured laminates having high tensile strength, flexural strength and heat resistance.

In the presence of both hydroxy compounds and diisocyanates the co-catalyst combination of aldehyde and tertiary amine is effective in producing new and interesting compositions comprising mixed polyisocyanates and polyurethanes.

EXAMPLE III

*TDI-polyol reaction with diazabicyclooctane and trioxymethylene*

50 parts of polypropylene glycol, PPG 1025, were put in a reaction vessel, 1.0 part of trioxymethylene (formaldehyde polymer) and 0.25 part of diazabicyclooctane were added and the mixture stirred to effect uniform solution.

17.4 parts of tolylene diisocyanate (Hylene TM-Du Pont) were then added with stirring.

In four minutes a maximum temperature of 66.3° C. was reached.

After 7.5 minutes of reaction time the mixture became more viscous and milky white in color. After 15 minutes the viscous product was split into two portions. In 18 hours at room temperature, one portion became a pale yellow rubbery mass. The second portion was heated in an oven about 20 minutes at 140° C., taking on the foamy appearance of expanded polyurethane, though considerably more dense and rubbery than a typical light (2 lb./sq. ft.) polyurethane foam.

Elastomeric products have been prepared using tolylene diisocyanate (Hylene TM), polypropylene glycol (PPG 1025), with diazabicyclooctane and typical $C_1$ to $C_{10}$ aldehydes as co-catalysts.

EXAMPLE IV

*TDI-polyol\* elastomers prepared with diazabicyclooctane and aldehydes*

| Aldehyde, g. (moles) | Max. temp. of exotherm (°C.) | Mins. to reach max. of exotherm | Prod. curing at room T. (64 hrs.) in glass | Prod. curing at 100° C. (64 hrs.) in glass |
|---|---|---|---|---|
| Trioxymethylene, 1.7 (.056) | 58 | 10 | Yellow opaque rubbery solid | Brownish-white opaque rubbery solid. |
| Paraldehyde, 2.49 (.057) | 65 | 5 | Viscous syrup | Rubbery solid. |
| Heptaldehyde, 6.33 (.056) | 66 | 6 | Clear yellow transparent rubbery solid | Tough yellow-brown rubbery solid. |
| Benzaldehyde, 5.88 (.055) | 57 | 9 | Yellow, very viscous syrup | Rubbery solid. |
| Butyraldehyde, 4.55 (.063) | 68 | 5 | Yellow transparent rubbery solid | Yellowish-brown rubbery solid. |
| o-Anisaldehyde, 7.55 (.063) | 66 | 6 | Clear, yellow transparent gel, tacky and elastic. | Yellow-brown somewhat tacky rubbery solid. |

*Charge=PPG 1025=100 g.=0.1 mole; Hylene TM=34.8 g.=0.2 mole; diazabicyclooctane=0.25 g.=0.0023 mole.

In each of the above preparations a portion of the reaction mixture was removed from the reaction vessel after the maximum exotherm was obtained. These viscous (uncured) syrups were spread on aluminum sheets and cured for 63 hours at room temperature. The resinous films obtained were strongly adherent to aluminum; and the film obtained with benzaldehyde acting as the co-catalyst was especially clear and free of blisters. These resins are promising as new types of elastomers, film forming materials, sealants, metal bonding agents, caulking compounds and adhesives.

Urethane condensation has been effectively catalyzed with 0.5 part of diazabicyclooctane per 100 parts of hydroxy material (polyol such as PPG 2000, polypropylene glycol approximately 2000 molecular weight), though concentrations of the tertiary amine catalyst may vary from 0.1 to 5 parts per 100 of polyol. To obtain the particular catalytic composition of our invention it has generally been desirable to use at least an equi-molar amount of a $C_1$ to $C_{10}$ aldehyde with diazabicyclooctane. The aldehyde concentration may thus vary from 30 parts of aldehyde to 110 parts of diazabicyclooctane (an equi-molar ratio for formaldehyde and diazabicyclooctane), to substantially larger amounts of higher molecular weight aldehydes, e.g., 210 parts of benzaldehyde per part of diazabicyclooctane, or roughly 200 moles of aldehyde per mole of diazabicyclooctane.

In general, the ratio of diisocyanates to polyols is in the range of 30–40 parts per 100 parts respectively. Smaller amounts of diisocyanates may be used with properties of the polymer varying accordingly. In the process of the invention, where isocyanate polymer formation is an important factor in controlling the properties of the polymer product, the ratio of organic isocyanate to polyol is at least 2 to 1 on an equivalent (NCO/OH) basis, as in Example III above, and may be as high as 4 or 6 to 1 where isocyanate polymers are formed and copolymerized with polyurethanes in the process.

Elastomers and dense rubbery foams as described in Example III may be expanded into lighter weight stable foams with supplementary blowing. As is well known in the art, this can be effected by reacting water with isocyanate in the formulation to form ureide-linked polymers and carbon dioxide. Such foamed products have been made though at relatively high cost in organic isocyanate. To obtain controlled foaming of such polyisocyanate-polyurethane elastomers, the use of 3 to 15% of selected Freons has been found effective.

EXAMPLE V 100 parts glycerine propoxide triol (11–300), 4000 mol. wt.~45 OH number
40 parts (TD–80) tolylene diisocyanate
0.7 part DABCO (diazabicyclooctane)
10.0 parts trioxymethylene
1.0 part organo-silicone (D.C. 199)
7.0 parts trichloro-trifluoroethane These ingredients are reacted in the usual way by dissolving the diazabicyclooctane, trioxymethylene and the silicone in water, mixing with polyol and Freon, adding the TDI with mixing and mixing for about 20 to 30 seconds until creaming is noted. The mix is then poured into a coated mold in which the product is foamed to a tough rubbery solid in about 3 to 4 minutes. The product is finished by an oven cure of 2 hours at 150° F. and removed from the mold as a tough foamed polyisocyanate-polyurethane product having a density of about 3 to 5 lb./ft.$^3$.

Reactions have been described using a combination of diazabicyclooctane and a $C_1$ to $C_{10}$ aldehyde as a catalyst in polymerizing isocyanates, particularly diisocyanates, and in condensing diisocyanates and polyols in a modified urethane reaction. Various modifications in this general area of reaction have been demonstrated and come within the scope of the invention. For example, diisocyanates and diisocyanate polymers retaining excess isocyanate reaction readily with monohydroxy compounds as well as with diols or polyols to form urethane modified polyisocyanates, which are, in themselves, interesting waxy resins. On reacting 1.0 part of trioxymethylene per 51.2 parts of heptadecanol, 34.5 parts of TDI and 0.25 part of diazabicyclooctane, a maximum pot temperature of 80° C. was noted in 20 minutes. A lime-colored waxy product was formed overnight which, after 18 hours curing at 100° C. became a clear yellow non-brittle solid.

The long chain alkyl urethane-modified polyisocyanate thus formed has been described as "blocked isocyanate" which is appreciably dissociated at higher temperatures of about 80–140° C. releasing isocyanates, which are reactive, for example, with polyols in urethane condensation or may polymerize further to more complex polyisocyanates.

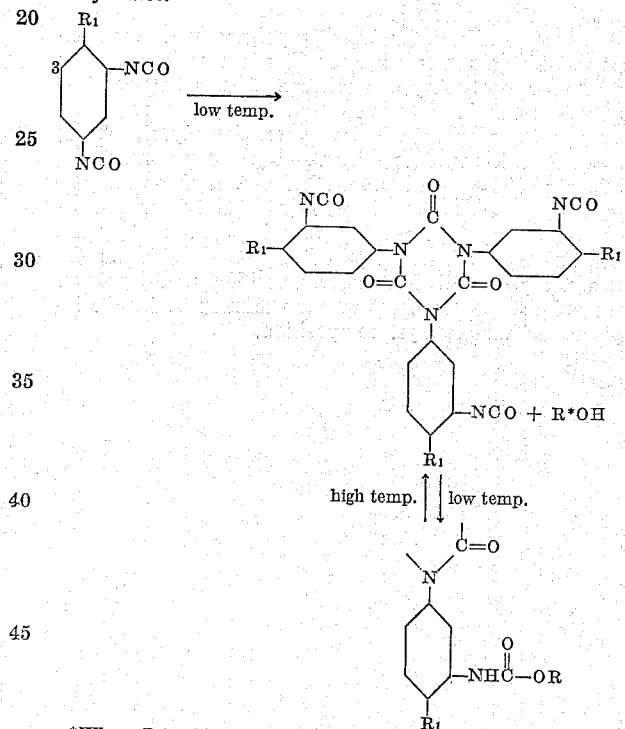

*Where R is alkyl, alkenyl, or aryl.

The co-catalytic action of $C_1$ to $C_{10}$ aldehydes has been shown to be particularly high with diazabicyclooctane, a very active tertiary amine catalyst for polyurethane formation. However, other tertiary amines which have heretofore been recognized as having catalytic effect in urethane condensation have now been found to be activated by aldehydes acting as co-catalysts.

EXAMPLE VI

*Isocyanate polymerization with benzaldehyde and tertiary amines*

[61 parts TDI and 5.88 parts benzaldehyde]

| Tert. amine | Wt. parts | ° C. max. temp. | Minutes to max. temp. | Product |
|---|---|---|---|---|
| Diazabicyclooctane | 0.25 | 82 | 69 | Hard yellow solid. |
| Triethylamine | 0.23 | 44 | 31 | Yellow transparent solid overnight. |
| N,N,N',N'-tetramethyl-butane-diamine 1,3 | 0.32 | 59 | 26 | Do. |
| N-methyl morpholine | 0.23 | 33 | 2 | Milky solution some ppt. |
| Pyridine | 0.18 | (*) | (*) | Yellow solution some ppt. |

*No apprec. temp. change.

The corresponding reactions with tertiary amine but with no aldehyde present produced no hard resins on standing over-night.

Obviously many modifications and variations of the invention as hereinbefore set forth may be made without departing from the spirit and scope thereof, and therefore only such limitations should be imposed as are indicated in the appended claims.

What is claimed is:

1. The method of preparing polymeric compositions which consists of: preparing a reaction mixture containing tolylene diisocyanate; adding to such reaction mixture a catalyst composition providing, per 100 parts of said reaction mixture, from 0.1 part to 10 parts of a mixture of diazabicyclooctane and $C_1$ to $C_{10}$ aldehyde, there being from 0.01 part to 10 parts of diazabicyclooctane per part of $C_1$ to $C_{10}$ aldehyde; and recovering the polymeric composition resulting from the polymerization of the reaction mixture under the influence of said catalyst composition.

2. The method of preparing polyurethane compositions which consists of: preparing a reaction mixture consisting essentially of tolylene diisocyanate and a polyol composition selected from the group consisting of glycerol propoxide and polypropyleneglycol; adding to such reaction mixture a catalyst composition providing, per 100 parts of said reaction mixture, from 0.1 part to 10 parts of a mixture of diazabicyclooctane and $C_1$ to $C_{10}$ aldehyde there being from 0.01 part to 10 parts of diazabicyclooctane per part of $C_1$ to $C_{10}$ aldehyde; and recovering the polyurethane composition resulting from the polymerization of the reaction mixture under the influence of said catalyst composition.

3. The method of preparing a polyisocyanurate composition which consists of adding a catalyst composition consisting of from 0.1 part to 10 parts of a mixture of diazabicyclooctane and $C_1$ to $C_{10}$ aldehyde to 100 parts of a reactive mixture containing tolylene diisocyanate there being from 0.01 part to 10 parts of diazabicyclooctane per part of $C_1$ to $C_{10}$ aldehyde and recovering the organic polymeric composition resulting from the polymerization of the tolylene diisocyanate under the influence of the diazabicyclooctane and aldehyde.

References Cited by the Examiner

UNITED STATES PATENTS

| | | | |
|---|---|---|---|
| 2,888,411 | 5/59 | Pace | 260—77.5 |
| 2,939,851 | 6/60 | Orchin | 260—77.5 |
| 2,949,431 | 8/60 | Britain | 260—77.5 |
| 3,010,963 | 11/61 | Erner | 260—77.5 |
| 3,087,912 | 4/63 | Wagner | 260—77.5 |

FOREIGN PATENTS 848,965 9/60 Great Britain.

OTHER REFERENCES

Degering: "Outline of Organic Nitrogen Compounds," 1950, page 313.

"Naming and Indexing of Chemical Compounds," Chemical Abstracts, page 46N, 47N, and 89N, 1962.

LEON J. BERCOVITZ, *Primary Examiner.*

H. N. BURSTEIN, P. E. MANGAN, DONALD E. CZAJA, *Examiners.*